(12) United States Patent
Zanotti et al.

(10) Patent No.: US 8,768,586 B2
(45) Date of Patent: Jul. 1, 2014

(54) METHOD OF CONTROLLING A VEHICLE EQUIPPED WITH AN INTERNAL COMBUSTION ENGINE WITH A STOP AND START SYSTEM

(71) Applicants: Fiat Group Automobiles S.p.A., Turin (IT); Magneti Marelli S.p.A., Corbetta (IT)

(72) Inventors: Massimo Zanotti, Vado (IT); Domenico Tavella, Turin (IT); Ferdinando De Cristofaro, Turin (IT); Stefano Sgatti, Imola (IT)

(73) Assignee: Magneti Marelli S.p.A., Corbetta (IT)

( * ) Notice: Subject to any disclaimer, the term of this patent is extended or adjusted under 35 U.S.C. 154(b) by 0 days.

(21) Appl. No.: 13/852,085

(22) Filed: Mar. 28, 2013

(65) Prior Publication Data

US 2013/0261911 A1    Oct. 3, 2013

(30) Foreign Application Priority Data

Mar. 29, 2012   (EP) .................................... 12425068

(51) Int. Cl.
*G06F 7/00*    (2006.01)
(52) U.S. Cl.
USPC .......................................................... 701/58
(58) Field of Classification Search
None
See application file for complete search history.

(56) References Cited

U.S. PATENT DOCUMENTS

| | | | |
|---|---|---|---|
| 4,967,385 A | 10/1990 | Brekkestran et al. | |
| 5,660,079 A | 8/1997 | Friedrich | |
| 5,875,679 A | 3/1999 | Salecker et al. | |
| 6,393,928 B1 | 5/2002 | Watanabe | |
| 8,412,430 B2 * | 4/2013 | Arai | 701/68 |
| 2011/0054752 A1 * | 3/2011 | Arai | 701/67 |
| 2011/0098881 A1 | 4/2011 | Tsutsumi et al. | |
| 2012/0152049 A1 * | 6/2012 | Benson et al. | 74/473.3 |

FOREIGN PATENT DOCUMENTS

| | | |
|---|---|---|
| EP | 0718142 A2 | 6/1996 |
| EP | 1104859 A2 | 6/2001 |
| JP | 2008-302821 A | 12/2008 |
| JP | 2010-60125 A | 3/2010 |

* cited by examiner

*Primary Examiner* — Thomas Tarcza
*Assistant Examiner* — Adam Alharbi
(74) *Attorney, Agent, or Firm* — Howard & Howard Attorneys PLLC

(57) ABSTRACT

A method of controlling a vehicle equipped with an internal-combustion engine with a "stop and start" system. The method provides, during vehicle running, for learning the "duty cycle" values associated with the odd gears and even gears, determining the "maximum duty cycle" value for the odd gears and "minimum duty cycle" value for the even gears, determining a duty-cycle band to which the "neutral gear" condition corresponds on the basis of the "minimum duty cycle" value for the even gears and "maximum duty cycle" value for the odd gears, and controlling the "stop and start" system on the basis of the duty-cycle band to which the "neutral gear" condition corresponds.

8 Claims, 3 Drawing Sheets

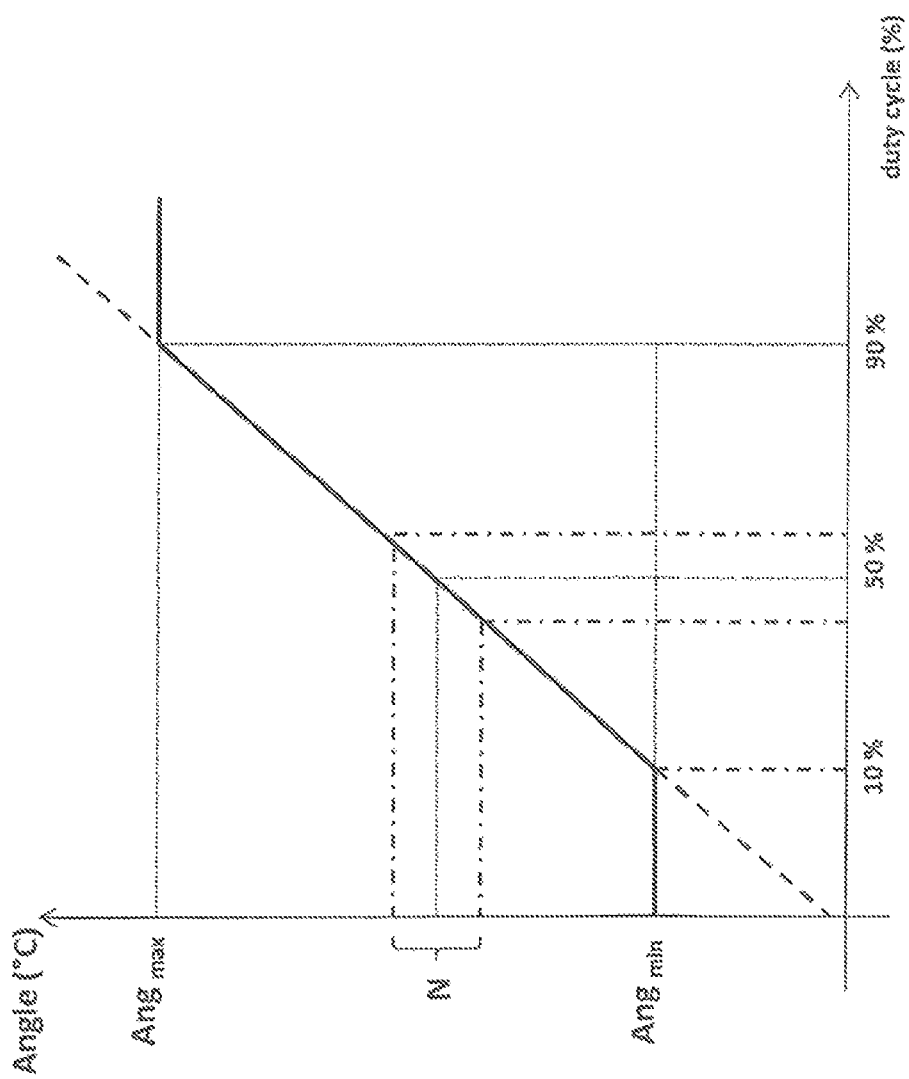

Figure 1:
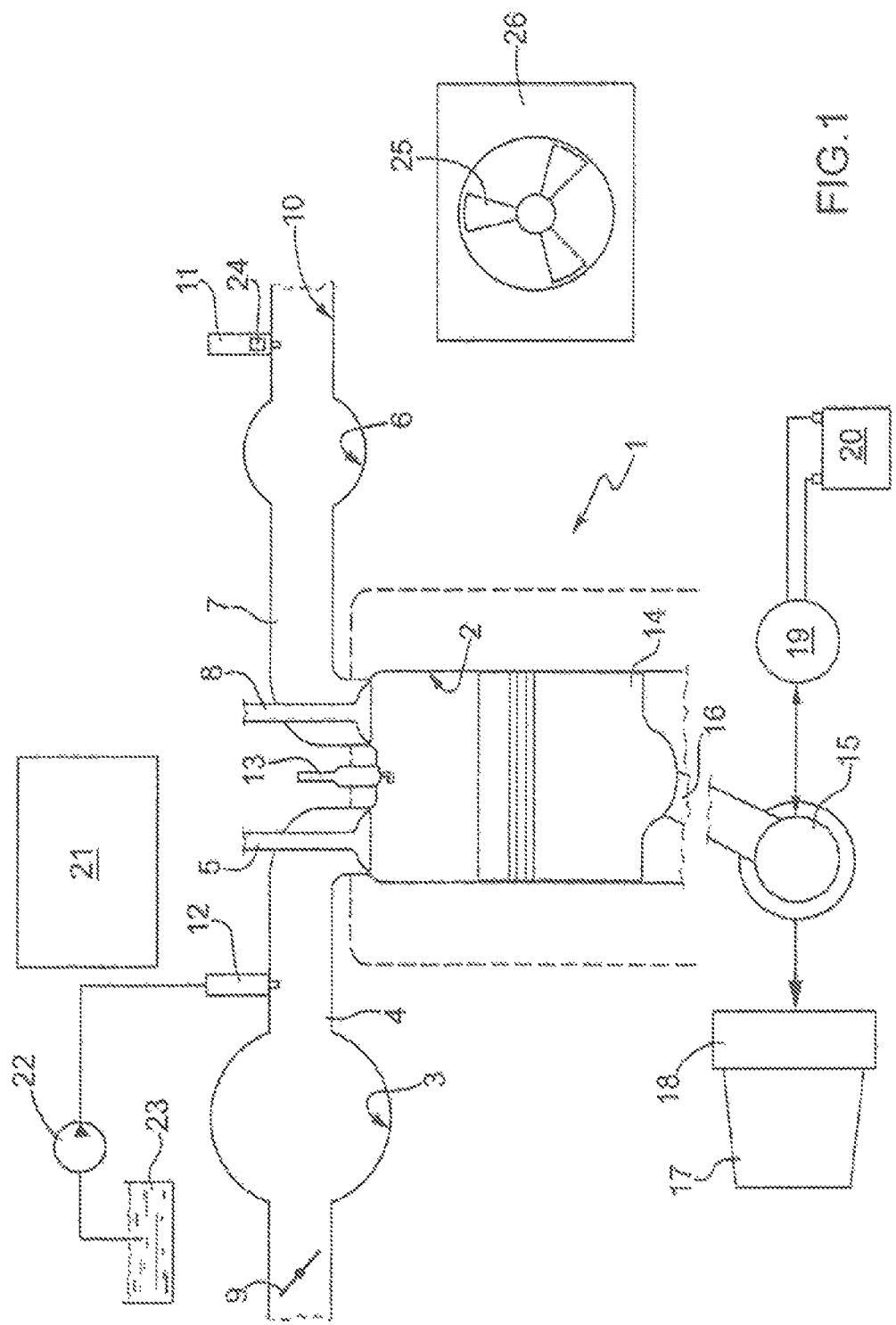

METHOD OF CONTROLLING A VEHICLE EQUIPPED WITH AN INTERNAL COMBUSTION ENGINE WITH A STOP AND START SYSTEM

This application is based upon and claims priority to European Patent Application 12425068.9 tied on Mar. 29, 2012.

BACKGROUND OF INVENTION

1. Field of Invention

The invention relates to, in general a method of controlling a vehicle equipped with an internal-combustion engine and, in particular, such a method using a "stop and start" system.

2. Description of Related Art

An internal-combustion engine includes a number of cylinders (normally, four arranged in line) equipped with respective pistons connected to an engine crankshaft by connecting rods. The shaft of an electric-starter motor powered by the vehicle's battery is also mechanically connected to the engine crankshaft of the internal-combustion engine. To start the internal-combustion engine, the electric motor drives the engine crankshaft into rotation from a starting position in which the engine crankshaft is stationary. As soon as the engine crankshaft starts to turn, fuel is directly or indirectly injected into the cylinders to try to achieve initial firing in the shortest possible time and, consequently, enable the internal-combustion engine to become self-sustaining.

The "stop and start" system stops the internal-combustion engine when the vehicle is stationary or about to stop [typically, for traffic-related motives (such as a red traffic light) or crossroads without right of way] and restarts the internal-combustion engine as soon as the driver operates the clutch pedal.

Certain problems arise in vehicles equipped with an internal-combustion engine with a "stop and start" system and a manual gearbox.

As the "stop and start" system is implemented by the engine-control unit (that is to say, it is set op to enable and disable this system, which stops the internal-combustion engine when the vehicle is stationary or about to stop and restarts it as soon as the driver operates the clutch pedal), it is extremely important that the engine-control unit can accurately and precisely identity the "neutral gear" condition.

For example, EP1104859 discloses a method of controlling the transmission of a vehicle, which includes the steps of providing a pair of position sensors and using the signals coming from both the position sensors to determine the "neutral gear" condition.

EP718142 discloses a "gearshift control" system (in particular, for tractors or other earth-moving machines) that includes in a preliminary "setting up" phase the step of providing a position sensor that is set to read the position of the gearshift actuator piston. This method includes furthermore the steps of learning by the position sensor a first and second end value, calculating a first threshold value through the algebraic sum of the first end value and a correction margin, calculating a second threshold value through the algebraic difference between the second end value and correction margin, and determining a value range (which corresponds to the "neutral gear" condition) as a function of the mean value of the first threshold value, the second threshold value, and a constant value.

JP2008302821 discloses a method of controlling the gearshift of a vehicle, which includes in a preliminary "setting up" phase the step of arranging close to the driver-operated gear-selection lever a sensor that is set to read when in use the position of the gear-selection lever. This method includes furthermore the step of learning the value read by the sensor, which corresponds to the "neutral gear" condition, in an initial learning step.

JP2010060125 discloses a method of learning the reference position of a driver-operated gear-selection lever as a function of the comparison between two signals coming from a pair of sensors in successive operating cycles.

U.S. Pat. No. 6,393,928 discloses a system for controlling the gearshift of a vehicle by a pair of sensors. The method includes, at first, the step of learning the values read by the sensors (which correspond to the "neutral gear" condition) and, subsequently, the step of engaging the other even and odd gears.

U.S. Pat. No. 5,875,670 discloses an apparatus for controlling the gearshift of a vehicle equipped with a pair of position sensors. The method includes the steps of determining in a preliminary "setting up" phase a set of tolerance values and learning the values read by the sensors, which correspond to the "neutral gear" condition that is in a substantially central position. During normal vehicle running, the "even or odd gear" condition is determined as a function of the comparison of the signals coming from the pair of position sensors with the values corresponding to the "neutral gear" condition and set of tolerance values.

U.S. Pat. No. 5,660,079 discloses a system for controlling the transmission of a vehicle equipped with a sensor arranged close to the shift lever. The method includes the step of learning the values read by the sensor to determine the "forward and reverse gear" conditions and "neutral, gear" condition. In particular, the method includes the step of learning the value react by the sensor, which corresponds to the "neutral gear" condition in an initial learning step to allow the subsequent learning of the "forward and reverse gear" conditions.

U.S. Patent Application Publication 201109881 discloses a system for controlling a vehicle provided with a pair of sensors that are both arranged close to the shift lever. The method includes the steps of determining in a preliminary step a value range associated with each possible gear condition and comparing in use each value range with the signals coming from the pair of sensors to determine the gear condition.

The methods described above, though, do not guarantee an accurate and precise identification of a "neutral gear" condition that, above all, is reliable in time (even in a ease of fault of some components). This can cause a failure to stop and/or an undesired restarting of the vehicle's engine with the "stop and start" system.

The object of the invention is to provide a method of controlling a vehicle equipped with an internal-combustion engine with a "stop and stall" system, which method permits the drawbacks of the related art to be overcome while being simple and inexpensive to implement.

SUMMARY OF INVENTION

The invention overcomes the drawbacks in the related art in a method of controlling a vehicle equipped with an internal-combustion engine with a "stop and start" system. The internal-combustion engine includes a driver-operated gear-selection lever and gearbox. Odd gears are coupled to a same first primary shaft of the gearbox, and even gears are coupled to a same second primary shaft of the gearbox. The method comprises steps of: providing, in a preliminary adjustment phase, a position sensor close to the gear-selection lever and being set-up to read the position of the gear-selection lever; learning, during vehicle running, respective "duty cycle" values associated with the odd gears and even gears; determining a "maximum duty cycle" value of the "duty cycle" values that correspond to a condition of the odd gears; determining a "minimum duty cycle" value of the "duty cycle" values that correspond to a condition of the even gears; determining a duty-cycle band to which a "neutral gear" condition corresponds and that is included within a value range extremes of which are represented by the "minimum duty cycle" value of the "duty cycle" values that correspond to the "even gears" condition and "maximum duty cycle" value of the "duty cycle" values that correspond to the "odd gears" condition; and controlling the "stop and start" system (namely, controlling restarting of the internal-combustion engine when a driver operates a clutch pedal and/or enabling switch-off of the internal-combustion engine on a basis of the duty-cycle band to which the "neutral gear" condition corresponds).

Other objects, features, and advantages of the invention are readily appreciated as it becomes more understood while the subsequent detailed description of at least one embodiment of the invention is read taken in conjunction with the accompanying drawing thereof.

BRIEF DESCRIPTION OF EACH FIGURE OF DRAWING OF INVENTION

Figure 2:
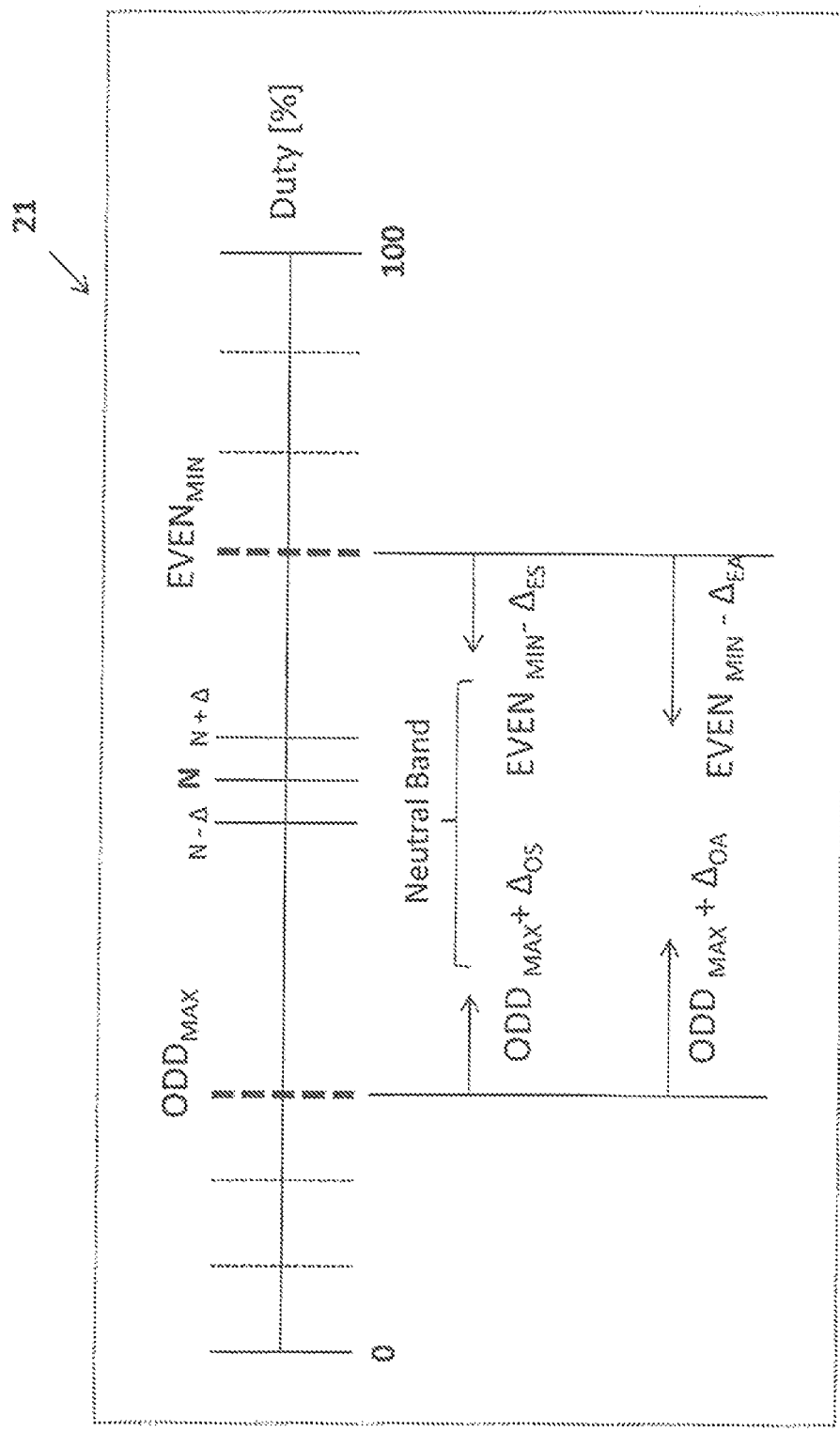

FIG. 1 is a schematic view of an internal-combustion engine with a "stop and start" system equipped and an electronic-control unit that implements a control method according to the invention;

FIG. 2 schematically shows the method of learning the neutral position in FIG. 1; and FIG. 3 schematically shows, in the "angle measured/duty cycle" plane, the operating characteristics of a position sensor of the engine of FIG. 1.

DETAILED DESCRIPTION OF EMBODIMENTS OF INVENTION

In FIG. 1, an internal-combustion engine is indicated in its entirety at 1. The engine 1 includes four cylinders 2 (of which only one is shown in FIG. 1) arranged in line.

Each cylinder 2 is connected to an inlet manifold 3 by its inlet port 4 (controlled by at least one inlet valve 5) and an exhaust manifold 6 by its exhaust port 7 (controlled by at least one exhaust valve 8). The inlet manifold 3 receives fresh air (i.e., air coming from the outside environment) through a butterfly valve 9 that is adjustable between a closed position and position of maximum opening. An exhaust system 10 equipped with at least one catalytic converter (not shown in detail) runs from the exhaust manifold 6 to discharge the gases produced by combustion in the cylinders 2 into the atmosphere. At least one mixture-strength-sensor device 11 (in particular, a "lambda" sensor 11) is positioned in the exhaust system 10.

Four injectors 12 (one for each cylinder 2) are connected to the respective inlet ports 4 to cyclically inject petrol into the inlet ports 4. According to a different embodiment that is not shown, the injectors 12 inject the fuel directly into the cylinders 2. Four spark plugs 13 (one for each cylinder 2) are connected to the respective cylinders 2 to cyclically ignite the mixture present inside the cylinders 2. Obviously, in the ease of a diesel-powered internal-combustion, engine 1, the spark plugs 13 are not present.

Each cylinder 2 is coupled to a respective piston 14, which is able to slide linearly along the cylinder 2 and mechanically connected to an engine crankshaft 15 by a connecting rod 16. In turn, the engine crankshaft 15 is mechanically connected through a clutch 18 to a gearbox 17 to transmit engine torque to the vehicle's driven wheels (not shown). An electrical machine 19 (which is electrically connected to a battery 20 and able to function both as an electric-starter motor to start rotation of the engine crankshaft 15 and electric generator to recharge the battery 20) is mechanically connected to the engine crankshaft 15.

The engine 1 includes an engine-control unit 21 that oversees the running of the engine 1. In particular, the engine-control unit 21 is able to control the starting of the engine 1 in which the electric motor 19 drives the engine crankshaft 15 in rotation from a starting position "P" in which the engine crankshaft 15 is stationary. As soon as the engine crankshaft 15 starts to turn, fuel is injected into the cylinders 2 to try to achieve initial firing in the shortest possible time and, consequently, enable the internal-combustion engine 1 to become self-sustaining.

The engine-control unit 21 controls an electric motor (not shown in detail) that drives a feel pump 22, which draws fuel from a fuel tank 23 and feeds the fuel under pressure to the injectors 12. In the ease of an internal-combustion engine 1 with direct fuel injection, a further high-pressure pump is normally provided that is mechanically connected to the engine crankshaft 15 and directly driven by the rotation of the engine crankshaft 15. In addition, the engine-control unit 21 controls an electric heater 24 for the "lambda" sensor 11 and electric fan 25 coupled to a coolant radiator 26 of the engine 1.

In addition, the engine-control unit 21 implements the "stop and start" system that stops the internal-combustion engine 1 when the vehicle is stationary or about to stop [typically, for traffic-related reasons (such as a red traffic light or crossroads without a right of way] and restarts the internal-combustion engine 1 as soon as the driver operates the clutch pedal. The "stop and start" system also stops the internal-combustion engine 1 with the vehicle in movement at low speed if the driver does not request traction (i.e., releases the accelerator pedal).

In other words, the "stop and start" system stops the internal-combustion engine 1 when it is reputed that it not necessary to generate any engine torque for a sufficiently long time interval and starts the internal-combustion engine 1 when the generation of engine torque is requested.

The internal-combustion engine 1 is installed in a vehicle (not shown) equipped with a driver/passenger compartment inside of which there is a clutch pedal (not shown) and manual gear-selection lever (not shown) that can be operated by the driver and controls the manual gearbox 17 of a traditional type.

As previously mentioned, the engine-control unit 21 implements the "step and start" system, and, therefore, the engine control unit 21 must decide when to enable and disable this "stop and start" system. Since the "stop and start" system stops the internal-combustion engine 1 (when the vehicle is stationary or, in any case, about to stop) and restarts the internal-combustion engine 1 as soon as the driver operates the clutch pedal, it is extremely important to be able to accurately and precisely identity the "neutral gear" condition.

The vehicle is, therefore, equipped with a position sensor (of known type and not described in detail) that is placed close to the driver-operated gear-selection lever. The position sensor is connected to the engine-control unit 21 that implements the "stop and start" system and is set-up to transmit a signal to the engine-control unit 21 regarding the position of the driver-operated gear-selection lever to allow identification of the "neutral gear" condition. It should be pointed out that a single position lever placed close to the driver-operated gear-selection lever is sufficient. In other words, one does not need to provide a plurality of sensors, and the method implemented by the engine-control unit 21 for the identification of the "neutral gear" condition described below is robust enough (even with a single position sensor).

The method implemented by the engine-control unit 21 for identification of the "neutral gear" condition is described below.

As is known, the engine crankshaft 15 of an internal-combustion engine is mechanically connected to the gearbox 17 to define a number of gears (indicated at I, II, III, IV, V) by a plurality of gears. In an embodiment, the ODD gears (first gear I, third gear III, and fifth gear V) are coupled to a same first primary shaft of the gearbox 17 while the EVEN gears (second gear II and fourth gear IV) are coupled to a same second primary shah of the gearbox 17.

In a preliminary "setting up and tuning" step for the vehicle, which normally takes place in the vehicle's "EOL (end of line)" step, the positions of the driver-operated gear-selection lever are learned (by a PWM sensor the duty cycle of which varies as the position of the gear-selection lever itself varies according to the characteristics shown in FIG. 3, which is better described below). The positions of the driver-operated gear-selection lever respectively correspond to the "neutral gear" condition "N," "ODD gear" condition (first gear I, third gear III, and fifth gear V), and "EVEN gear" condition (second gear II and fourth gear IV). The positions of the driver-operated gear-selection lever respectively correspond to "duly cycle" values in the "neutral gear" condition "N," "ODD gear" condition (first gear I, third gear III, and fifth gear V) and "EVEN gear" condition (second gear II and fourth gear IV).

FIG. 3 schematically shows the operating characteristics of the position sensor in a plane having as coordinates the duty cycle and angle measured by the position sensor close to the driver-operated gear-selection lever.

According to an embodiment, a PWM sensor is used as a position sensor close to the driver-operated gear-selection lever. The PWM sensor has a duty cycle that varies as a function of the position of the gear-selection lever itself.

Therefore, it has been experimentally verified from the characteristics of the position sensor that the "duty cycle" values corresponding to the "ODD gear" condition (namely, the "duty cycle" values corresponding to the angle values measured by the position sensor close to the gear-selection lever for the ODD gears concentrated close to the angle "$Ang_{min}$") are approximately grouped in the "0-20%" band of the duty cycle. The "duty cycle" values corresponding to the "EVEN gear" condition (namely, the "duty cycle" values corresponding to the angle values measured by the position sensor close to the gear-selection lever for the EVEN gears close to the angle "$Ang_{max}$") are approximately grouped in the "80-100%" band of the duty cycle. Finally, the "duty cycle" values corresponding to the "neutral gear" condition "N" are grouped in a neighborhood of the 50% of the duty cycle. Therefore, according to FIG. 2, the "duty cycle" values corresponding to the "neutral gear" condition "N" are interposed between the "duty cycle" values corresponding to the "EVEN gear" condition and the "duty cycle" values corresponding to the "ODD gear" condition.

In addition, the electronic-control unit 21 is set-up to calculate an initial range of "duty cycle" values in which, following a stop or switch-off, the internal-combustion engine 1 is restarted as soon as the driver operates the clutch pedal. A safety value Δ (in an embodiment, constant) is set in the preliminary step. The initial range is delimited by two end values: a first initial end value "N+Δ" that is calculated by the algebraic addition of the safety value Δ and initial "duty cycle" value (which corresponds to the "neutral gear" condition "N") and a second initial end value "N−Δ" that is, instead, calculated by the algebraic difference between the initial "duty cycle" value (which corresponds to the "neutral gear" condition "N") and safety value Δ.

The values learned during this "setting up and tuning" step are stored in a volatile ("EEPROM" type) memory and represent the initialization values with regard to the "neutral gear" condition "N," "ODD gears" condition, and "EVEN gears" condition.

According to FIG. 2, when in use during normal vehicle running, the position sensor is set to acquire the position of the driver-operated gear-selection lever and transmit a signal to the electronic-control unit 21 regarding the acquired position. The electronic-control unit 21 consequently acquires a "duty cycle" value for each of the single gears that are engaged during normal vehicle running.

The "maximum duty cycle" value $ODD_{max}$ within the band defined by the "duty cycle" values that correspond to the condition of ODD gears engaged during running (therefore, approximately in the "0-20%" band of the duty cycle) is then identified.

In an identical manner, the "maximum duty cycle" value $EVEN_{max}$ within the band defined by the "duty cycle" values that correspond to the condition of EVEN gears engaged during running (therefore, approximately in the "80-100%" band of the duty cycle) is then identified.

A first "duty-cycle threshold" value $\Delta_{OS}$ for the ODD gears and second "duty-cycle threshold" value $\Delta_{ES}$ for the EVEN gears are also determined in a preliminary "setting up and tuning" step. The "duty-cycle threshold" value $\Delta_{OS}$ for the ODD gears and "duty-cycle threshold" value $\Delta_{ES}$ for the EVEN gears can be determined according to alternative embodiments, which can be the same or different. In addition, the two values $\Delta_{OS}$, $\Delta_{ES}$ can alternatively be constants or variables based on a plurality of parameters (such as the age of the vehicle, "duty cycle" value, etc.).

The electronic-control unit 21 is set-up to calculate a duty-cycle band by which switch-off of the internal-combustion engine 1 is enabled when the vehicle is stationary or about to stop. The band is indicated by "Neutral Band" in FIG. 2 and delimited by two end values with a first end value "$ODD_{max}+\Delta_{OS}$" for the ODD gears that is calculated by the algebraic addition of the first "duty-cycle threshold" value $\Delta_{OS}$ for the ODD gears and "maximum duty cycle" value $ODD_{max}$ for the ODD gears.

A second end value "$EVEN_{min}-\Delta_{ES}$" for the EVEN gears is, instead, calculated by the algebraic difference between the "minimum duty cycle" value $EVEN_{min}$ for the EVEN gears and second "duty-cycle threshold" value $\Delta_{ES}$ for the EVEN gears.

The first end value "$ODD_{max}+\Delta_{OS}$" and second end value "$EVEN_{min}-\Delta_{ES}$," therefore, delimit a duty-cycle band in which the electronic-control unit 21 is set to enable switch-off of the internal-combustion engine 1 as the vehicle is stationary or about to stop.

The range defined by the first end value "$ODD_{max}+\Delta_{OS}$" and second end value "$EVEN_{min}-\Delta_{ES}$" also represents the band identifying the "neutral gear" condition. In other words, the "neutral gear" condition is known for all the "duty cycle" values within the range in which the electronic-control unit 21 is set to enable switch-off of the internal-combustion engine 1 as the vehicle is stationary or about to stop.

In a preliminary "setting up and tuning" step, a first "duty-cycle tolerance" value $\Delta_{OA}$ for the ODD gears and second "duty-cycle tolerance" value $\Delta_{EA}$ for the EVEN gears are also determined. The "duty-cycle tolerance" value $\Delta_{OA}$ for the ODD gears and "duty-cycle tolerance" value $\Delta_{EA}$ for the EVEN gears can be determined according to alternative embodiments, which can be the same or different. In addition, the two tolerance values $\Delta_{OA}$, $\Delta_{EA}$ can alternatively be constants or variables based on a plurality of parameters (such as the age of the vehicle, "duty cycle" value, etc.).

The electronic-control unit 21 is set-up to calculate a duty-cycle band in which, following a stop or switch-off, the internal-combustion engine 1 is restarted as soon as the driver operates the clutch pedal. The band is delimited by two end values with a first end value "$ODD_{max}+\Delta_{OA}$" for the ODD gears that is calculated by the algebraic addition of the first "duty-cycle tolerance" value $\Delta_{OA}$ for the ODD gears and "maximum duty cycle" value $ODD_{max}$ for the ODD gears.

A second end value "$EVEN_{min}-\Delta_{EA}$" for the EVEN gears is, instead, calculated by the algebraic difference between the "minimum duty cycle" value $EVEN_{min}$ for the EVEN gears and second "duty-cycle tolerance" value $\Delta_{EA}$ for the EVEN gears.

The first end value "$ODD_{max}+\Delta_{OA}$" and second end value "$EVEN_{min}-\Delta_{EA}$," therefore, delimit a duty-cycle band in which the electronic-control unit 21 is set to restart the internal-combustion engine 1 as soon as the driver operates the clutch pedal following a stop or switch-off.

According to an embodiment shown in FIG. 2, the "duty-cycle tolerance" value $\Delta_{OA}$ for the ODD gears is different (in particular, greater) than the "duty-cycle threshold" value $\Delta_{OS}$ for the ODD gears. Similarly, the "duty-cycle tolerance" value $\Delta_{EA}$ for the EVEN gears is different (in particular, greater) than the "duty-cycle threshold" value $\Delta_{ES}$ for the EVEN gears.

According to this embodiment, the duty-cycle band in which the electronic-control unit 21 is set to enable switch-off of the internal-combustion engine 1 as the vehicle is stationary or about to stop has a greater range than the duty-cycle band in which (for obvious safety reasons and to avoid undesired and unforeseen vehicle restarts) the same electronic-control unit 21 is set to enable restarting of the internal-combustion engine 1 as soon as the driver operates the clutch pedal.

According to a further embodiment, the "duty-cycle tolerance" value $\Delta_{OA}$ for the ODD gears and "duty-cycle tolerance" value $\Delta_{EA}$ for the EVEN gears are equal to the "duty-cycle threshold" value $\Delta_{OS}$ for the ODD gears and "duty-cycle threshold" value $\Delta_{ES}$ for the EVEN gears, respectively.

It is immediately apparent how it is possible for the initialization value related to the "neutral gear" condition "N" not to be centred within the band defined by the first end value "$ODD_{max}+\Delta_{OS}$" and second end value "$EVEN_{min}-\Delta_{ES}$" (as shown in FIG. 2) in which the electronic-control unit 21 is set to enable switch-off of the internal-combustion engine 1 as the vehicle is stationary or about to stop (i.e., in the "neutral gear 'N'" band indicated as "Neutral Band"). The initialization value related to the "neutral gear" condition "N" can be alternatively moved close to the first end value "$ODD_{max}+\Delta_{OS}$" or second end value "$EVEN_{min}-\Delta_{ES}$."

Therefore, in use, learning the "duty cycle" value associated with each single gear engaged takes place continuously, and the values that are learned each time are stored in a vector in a volatile ("EEPROM" type) memory. At the end of the line, all values of the vector are initialized to a same default value (in particular, 255).

A plurality of conditions must be checked for the electronic-control unit 21 to enable learning of the "duty cycle" value associated with each single gear engaged.

A (non-exhaustive) list of the conditions that must be cheeked to enable learning of the "duty cycle" value associated with each single gear engaged is provided below.

First of all, it is necessary that the position sensor located close to the driver-operated gear-selection lever is not jammed. To check that the position sensor is not jammed, it is necessary to verify that the currently-engaged gear effectively corresponds to the gear that is established on the basis of the duty cycle detected by the position sensor located close to the gear-selection lever.

In addition, position-sensor malfunctions must not occur, and the information regarding vehicle speed and the number of revolutions of the internal-combustion engine 1 most be reliable (information regarding vehicle speed and the number of revolutions of the internal-combustion engine 1 is needed to determine the currently-engaged gear).

The preliminary "setting up and tuning" step of the vehicle, which normally takes place at EOL (end of line), must be successfully concluded. This means that the values related to the "neutral gear" condition "N," "ODD gears" condition (first gear I, third gear III, fifth gear V), and "EVEN gears" condition (second gear II, fourth gear IV) must have been successfully initialized.

The duty cycle of the position sensor and ratio between vehicle speed and the number of revolutions of the internal-combustion engine 1 must be substantially stable to verify that the current gear is effectively engaged.

The pedal of the clutch 18 must be released. In fact, in the case where the driver keeps the pedal of the clutch 18 pressed down, torque is not transferred to the driven wheels as the transmission is interrupted, and the information regarding the ratio between vehicle speed and the number of revolutions of the internal-combustion engine 1 loses meaning.

In a preliminary "setting up and tuning" step, a lower-limit value and an upper-limit value are determined for the number of revolutions of the internal-combustion engine 1. The current number of revolutions of the internal-combustion engine 1 must be within a range defined by the lower- and upper-limit values.

Lastly, the torque effectively delivered to the driven wheels must be greater than a threshold value (predetermined in a preliminary tuning step) to avoid possibly anomalous conditions arising in detecting the ratio between vehicle speed and the number of revolutions of the internal-combustion engine 1 (as, for example, in the case of a long descent in neutral gear).

The enabling conditions described to now all must be verified simultaneously and maintained for a sufficient period of time to permit enabling of the self-learning procedure. In fact, an enabling time is determined in a preliminary step with a predetermined duration, which can then vary in the course of time according to a series of parameters (such as the age of the vehicle). For the electronic-control unit 21 to proceed with the step of self-learning the "duty cycle" values, the above-listed enabling conditions must be verified for a period lasting longer than the duration of the enabling time.

During normal vehicle running, the signal coming from the position sensor is filtered by a first-order filter (in an embodiment, of the "low pass" type).

According to an embodiment, two mutually different first-order filters are used (i.e., with two different time constants). The first filter is quicker and used during an initial step of acquiring the "duty cycle" values associated with each single gear engaged while the second filter is slower and used in a subsequent step for confirming the values acquired during the initial step.

As announced, the learning of "duty cycle" value associated with each single gear engaged takes place continuously during normal vehicle running, and the values that are learned are stored in a vector in a volatile memory ("EEPROM" type) in which the initialization values are equal to 255.

During normal vehicle running, the learned and stored "duty cycle" values enable updating of the duty-cycle band in which, following a stop or switch-off, the internal-combustion engine 1 is restarted as soon as the driver operates the clutch pedal. In other words, the end values of the initial range of "duty cycle" values are updated according to the previously described method to permit broadening of the duty-cycle band in which, following a stop or switch-off, the internal-combustion engine 1 is restarted as soon as the driver operates the clutch pedal and, therefore, strengthen identification of the "neutral gear" condition "N."

The method also provides for establishing a number of quality indicators (i.e. regarding the solidity and reliability of the self-learning of the "duty cycle" values). In particular, a "confidence" time is set in a preliminary "setting up and tuning" step with a predetermined duration, which can then vary in the course of time according to a series of parameters (such as the age of the vehicle) and lasts for a substantially long period (for example, three or four hours). In addition, a safety band (expressed in a low percentage points) is set in a preliminary "setting up and tuning" step with a predetermined breadth, which can then vary in the course of time according to a series of parameters (such as the age of the vehicle).

To enable the learning of the new "duty cycle" value associated with an engaged gear that is stored in the electronic-control unit 21, it is necessary that the self-learned value remains within the safety band for a time equal to at least the "confidence" time. In other words, if these two conditions are both satisfied, the self-learned "duty cycle" value is sufficiently robust and reliable, and the electronic-control unit 21 can be updated with the new "duty cycle" value. When the vehicle is next started, "duty cycle" values are then updated, and, consequently, the end values of the identification range for the "neutral gear 'N'" band are updated.

According to an embodiment, it is possible to provide in a preliminary "setting up and tuning" step a calibratable mask in the electronic control unit 21 to enable learning of the new associated "duty cycle" value only for a predetermined number of engaged gears.

The above-described method for learning the position of the neutral gear "N" in a vehicle equipped with an internal-combustion engine 1 with a "stop and start" system has numerous advantages. In particular, the method is very robust and reliable in identifying the "neutral gear" band ("Neutral Band"), even in the ease of malfunctioning of the gearbox lever or sensor located close to the driver-operated gear-selection lever. Also, it is able to perfectly adapt to any engine configuration (diesel, petrol, LPG, natural gas) or a hybrid vehicle equipped with a manual gearbox. And, it does not require changes to the vehicle's layout (in fact, the sensor remains positioned close to the driver-operated gear-selection lever as in current configurations).

It should be appreciated by those having ordinary skill in the related art that the invention has been described above in an illustrative manner. It should be so appreciated also that the terminology that has been used above is intended to be in the nature of words of description rather than of limitation. It should be so appreciated also that many modifications and variations of the invention are possible in light of the above teachings. It should be so appreciated also that, within the scope of the appended claims, the invention may be practiced other than as specifically described above.

What is claimed is:

1. A method of controlling a vehicle equipped with an internal-combustion engine (1) with a "stop and start" system, wherein the internal-combustion engine (1) includes a driver-operated gear-selection lever and gearbox (17) and odd gears (ODD) are coupled to a same first primary shaft of the gearbox (17) and even gears (EVEN) are coupled to a same second primary shaft of the gearbox (17), the method comprising steps of:

providing, in a preliminary adjustment phase, a position sensor close to the gear-selection lever and being set-up to read the position of the gear-selection lever;

learning, during vehicle running, respective "duty cycle" values associated with the odd gears (ODD) and even gears (EVEN);

determining a "maximum duty cycle" value ($ODD_{max}$) of the "duty cycle" values that correspond to a condition of the odd gears (ODD);

determining a "minimum duty cycle" value ($EVEN_{min}$) of the "duty cycle" values that correspond to a condition of the even gears (EVEN);

determining a duty-cycle band to which a "neutral gear" condition (N) corresponds and that is included within a value range extremes of which are represented by the "minimum duty cycle" value ($EVEN_{min}$) of the "duty cycle" values that correspond to the "even gears (EVEN)" condition and "maximum duty cycle" value ($ODD_{max}$) of the "duty cycle" values that correspond to the "odd gears (ODD)" condition; and controlling the "stop and start" system by at least one of controlling restarting of the internal-combustion engine (1) when a driver operates a clutch pedal and enabling switch-off of the internal-combustion engine (1) on a basis of the duty-cycle hand to which the "neutral gear" condition (N) corresponds.

2. A method according to claim 1, wherein the method comprises further steps of:

determining, in a preliminary "set up and adjustment" phase, a first "duty-cycle threshold" value ($\Delta_{OS}$) for the odd gears (ODD) and second "duty-cycle threshold" value ($\Delta_{ES}$) for the even gears (EVEN);

calculating a first end value ($ODD_{max}+\Delta_{OS}$) for the odd gears (ODD) through an algebraic addition of the first "duty-cycle threshold" value ($\Delta_{OS}$) for the odd gears (ODD) and "maximum duty cycle" value ($ODD_{max}$) of the "duty cycle" values that correspond to the "odd gears (ODD)" condition;

calculating a second end value ($EVEN_{min}-\Delta_{ES}$) for the even gears (EVEN) through an algebraic difference between the "minimum duty cycle" value ($EVEN_{min}$) of the "duty cycle" values that correspond to the "even gears (EVEN)" condition and second "duty-cycle threshold" value ($\Delta_{ES}$) for the even gears (EVEN);

determining the duty-cycle band to which the "neutral gear" condition (N) corresponds and included within a value range extremes of which are represented by the first end value ($ODD_{max}+\Delta_{OS}$) for the odd gears (ODD) and second end value ($EVEN_{min}-\Delta_{ES}$) for the even gears (EVEN); and controlling the "stop and start" system by the at least one of controlling restarting of the internal-combustion engine (1) when the driver operates the clutch pedal and enabling switch-off of the internal-combustion engine (1) on the basis of the duty-cycle band to which the "neutral gear" condition (N) corresponds.

3. A method according to claim 1, wherein the method comprises further steps of:
- determining, in a preliminary "set up and adjustment" phase, a first "duty-cycle tolerance" value ($\Delta_{OA}$) for the odd gears (ODD) and second "duty-cycle tolerance" value ($\Delta_{EA}$) for the even gears (EVEN);
- calculating a further first end value ($ODD_{max}+\Delta_{OA}$) for the odd gears (ODD) through an algebraic addition of the first "duty-cycle tolerance" value ($\Delta_{OA}$) for the odd gears (ODD) and "maximum duty cycle" value ($ODD_{max}$) of the "duty cycle" values that correspond to the "odd gears (ODD)" condition;
- calculating a further second end value ($EVEN_{min}-\Delta_{EA}$) for the even gears (EVEN) through an algebraic difference between the "minimum duty cycle" value ($EVEN_{min}$) of the "duty cycle" values that correspond to the "even gears (EVEN)" condition and second "duty-cycle tolerance" value ($\Delta_{EA}$) for the even gears (EVEN);
- determining a further duty-cycle band on the basis of the further first end value ($ODD_{max}+\Delta_{OA}$) for the odd gears (ODD) and further second end value ($EVEN_{min}-\Delta_{EA}$) for the even gears (EVEN); and
- controlling the restarting of the internal-combustion engine (1) when the driver operates the clutch pedal on the basis of die further duty-cycle band.

4. A control method according to claim 2, wherein the first "duty-cycle tolerance" value ($\Delta_{OA}$) for the odd gears (ODD) is different than the first "duty-cycle threshold" value ($\Delta_{OS}$) for the odd gears (ODD) and the second "duty-cycle tolerance" value ($\Delta_{EA}$) for the even gears (EVEN) is different than the second "duty-cycle threshold" value ($\Delta_{ES}$) for the ever gears (EVEN).

5. A method according to claim 1, wherein the method comprises further steps of:
- storing the "duty cycle" values respectively associated with the odd gears (ODD) and even gears (EVEN) engaged during die vehicle running in an electronic-control unit (21); and
- updating, during the normal vehicle running, the "duty cycle" values respectively associated with the odd gears (ODD) and even gears (EVEN) that are stored in the electronic-control unit (21).

6. A control method according to claim 5, wherein the step of updating, during the normal vehicle running, the "duty cycle" values respectively associated with the odd gears (ODD) and even gears (EVEN) that are stored in the electronic-control unit (21) comprises sub-steps of:
- verifying a plurality of reference conditions; and
- enabling the continuous updating of the "duty cycle" values respectively associated with the odd gears (ODD) and even gears (EVEN) that are stored in the electronic-control unit (21) only in the case in which all of the reference conditions are successfully verified.

7. A control method according to claim 6, wherein the method comprises further sub-steps of:
- determining, in the preliminary "set up and adjustment" phase, an enabling time of predetermined duration; and
- enabling the continuous updating of the "duty cycle" values respectively associated with the odd gears (ODD) and even gears (EVEN) that are stored in the electronic-control unit (21) only in the case in which all of the reference conditions are successfully verified for a period of time greater than the enabling time.

8. An electronic-control unit that is set to implement a method of controlling a vehicle equipped with an internal-combustion engine (1) with a "stop and start" system, wherein the internal-combustion engine (1) includes a driver-operated gear-selection lever, gearbox (17) and odd gears (ODD) are coupled to a same first primary shaft of the gearbox (17) and even gears (EVEN) are coupled to a same second primary shaft of the gearbox (17), and the method includes steps of:
- providing, in a preliminary adjustment phase, a position sensor close to the gear-selection lever and being set-up to read the position of the gear-selection lever;
- learning, during vehicle running, respective "duty cycle" values associated with the odd gears (ODD) and even gears (EVEN);
- determining a "maximum duty cycle" value ($ODD_{max}$) of the "duty cycle" values that correspond to a condition of the odd gears (ODD);
- determining a "minimum duty cycle" value ($EVEN_{min}$) of the "duty cycle" values that correspond to a condition of the even gears (EVEN);
- determining a duty-cycle hand to which a "neutral gear" condition (N) corresponds and that is included within a value range extremes of which are represented by the "minimum duty cycle" value ($EVEN_{min}$) of the "duty cycle" values that correspond to the "even gears (EVEN)" condition and "maximum duty cycle" value ($ODD_{max}$) of the "duty cycle" values that correspond to the "odd gears (ODD)" condition; and
- controlling the "stop and start" system by at least one of controlling restarting of the internal-combustion engine (1) when a driver operates a clutch pedal and enabling switch-off of the internal-combustion engine (1) on a basis of the duty-cycle hand to winch the "neutral gear" condition (N) corresponds.

* * * * *

UNITED STATES PATENT AND TRADEMARK OFFICE
CERTIFICATE OF CORRECTION

PATENT NO.         : 8,768,586 B2                                  Page 1 of 1
APPLICATION NO.    : 13/852085
DATED              : July 1, 2014
INVENTOR(S)        : Massimo Zanotti et al.

It is certified that error appears in the above-identified patent and that said Letters Patent is hereby corrected as shown below:

In the Claims

Column 10, line 36 claim 1, delete "hand" and insert therefor --band--.

Column 11, line 25 claim 3, delete "die" and insert therefor --the--.

Column 11, line 31 claim 4, delete "ever" and insert therefor --even--.

Column 11, line 37 claim 5, delete "die" and insert therefor --the--.

Column 12, line 36 claim 8, delete "hand" and insert therefor --band--.

Column 12, line 48 claim 8, delete "hand to winch" and insert therefor --band to which--.

Signed and Sealed this
Tenth Day of February, 2015

Michelle K. Lee
*Deputy Director of the United States Patent and Trademark Office*